United States Patent

Kamps et al.

Patent Number: 5,815,914
Date of Patent: Oct. 6, 1998

[54] SORTING DEVICE

[75] Inventors: Rolf Kamps; Rainer Siegemund, both of Wuppertal, Germany

[73] Assignee: YKK Corporation, Tokyo, Japan

[21] Appl. No.: 743,124

[22] Filed: Nov. 1, 1996

Related U.S. Application Data

[63] Continuation of Ser. No. 377,920, Jan. 25, 1995, abandoned.

[30] Foreign Application Priority Data

Jan. 25, 1994 [DE] Germany .......................... 44 01 981.5

[51] Int. Cl.[6] .......................... B65G 47/14; B65H 67/06; D01H 9/18
[52] U.S. Cl. .............................. 29/798; 29/818; 221/281; 222/166
[58] Field of Search .............................. 29/798, 818, 821, 29/822; 221/167, 168, 281; 222/166, 167

[56] References Cited

U.S. PATENT DOCUMENTS

| | | |
|---|---|---|
| 2,595,071 | 4/1952 | Gartner . |
| 3,029,918 | 4/1962 | Stover . |
| 3,696,968 | 10/1972 | Jaech . |
| 4,238,023 | 12/1980 | Millar et al. . |

FOREIGN PATENT DOCUMENTS

| | | |
|---|---|---|
| 1187782 | 7/1957 | France . |
| 3916451 | 5/1989 | Germany . |
| 841093 | 7/1960 | United Kingdom . |
| 2159504 | 12/1985 | United Kingdom . |

Primary Examiner—Joseph M. Gorski
Attorney, Agent, or Firm—Robert W. Becker & Associates

[57] ABSTRACT

A sorting device for supplying small parts to a processing machine has a container with a fill opening for receiving the small parts. A drum-shaped rotating sorter for sorting the small parts is laterally connected to the container. The container has a lateral passage opening into the sorter for transferring the small parts from the container to the sorter. The container has a pivot axle for pivoting the container relative to the sorter in order to empty the container.

12 Claims, 3 Drawing Sheets

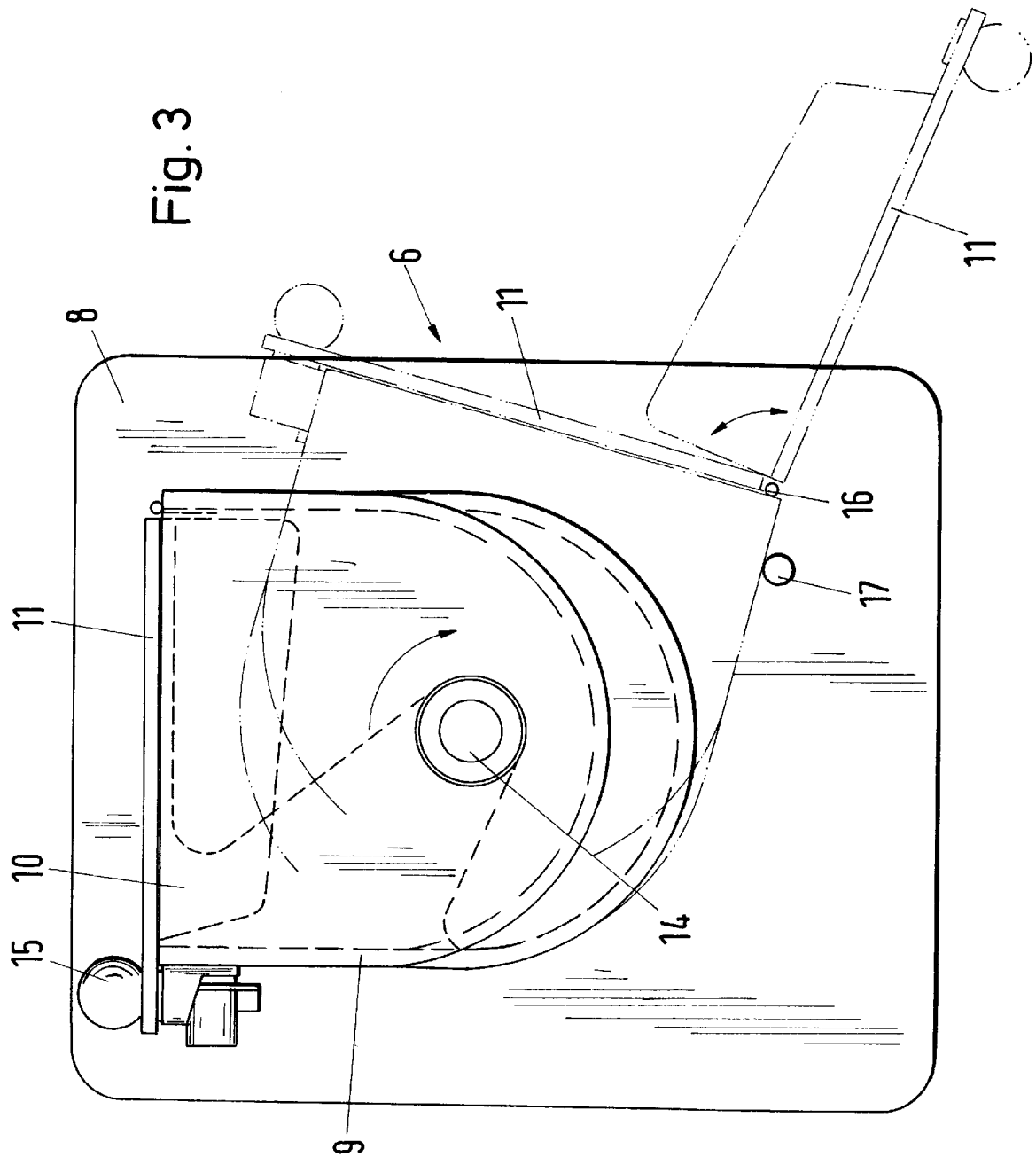

SORTING DEVICE

This application is a continuation of application Ser. No. 08/377,920 filed Jan. 25, 1995 and now abandoned.

BACKGROUND OF THE INVENTION

The present invention relates to a sorting device for supplying loose small parts to a machine for further automated processing, especially to ramming devices, whereby the sorting device is comprised of a laterally open tub-shaped container with a fill opening for the small parts as well as with a drum-shaped rotating sorter, laterally connected to the container, for sorting the small parts.

Sorting devices of the aforementioned kind are known. They serve to supply small parts for automated processing. Such small parts can be, for example, rivets, eyes, hooks, buttons, snap fasteners etc. which are to be connected to a support material with so-called ramming devices. Such ramming devices are comprised of a ramming tool which rams (connects) the small part into the support material. These small parts are loosely contained within the container of the sorting device into which the small parts are loosely filled. The small parts are guided, for example, via a rail from the sorting device to the ramming tool after sorting of the small parts within the rotating sorter. The sorting device for this purpose comprises a tub-shaped container that has a fill opening for the small parts and also has a lateral opening so as to communicate with the drum-shaped rotating sorter which conventionally is driven by a motor and which serves to individualize and align the small parts. The rotating sorter guides the small parts to the processing location. Such sorting devices are used in connection with a variety of production and mounting devices.

A problem encountered with the known sorting devices is that over time rejects are collected within the sorting device, i.e., small parts that cannot leave the sorting device due to deformations. Furthermore, it is desirable to be able to use the sorting device as an operational unit in connection with different production and/or mounting devices. In both cases the sorting device must be emptied from time to time. For this purpose known sorting devices must be completely demounted. However, it is also known to provide sorting devices with pivotable components, i.e., pivotable container and/or rotating sorters, which components however must be connected with special fastening means to the device after the step of emptying. When the attachment or fixation is not carried out properly, the operation of the device leads to malfunction, and, under certain circumstances, damage to the machine and/or economical damage may be caused.

It is therefore an object of the present invention to provide a sorting device of the aforementioned kind which can be easily emptied and which is safe and reliable during operation. Furthermore, a ramming device of the aforementioned kind is to be improved such that the sorting device can be more easily emptied and is more reliable and safe during operation.

SUMMARY OF THE INVENTION

The sorting device for supplying small parts to a processing machine according to the present invention is primarily characterized by:

A container with a fill opening for receiving the small parts;

A drum-shaped rotating sorter for sorting the small parts, the sorter laterally connected to the container;

The container having a lateral passage opening into the sorter for transferring the small parts from the container to the sorter;

The container comprising a pivot axle for pivoting the container relative to the sorter.

Preferably, the sorting device further comprises a lid for closing the container.

Advantageously, the lid is pivotably connected to the container.

Expediently, the lid has a substantially U-shaped cross-section.

In a preferred embodiment of the present invention, the container is secured in its filling and operating position.

Advantageously, the sorting device further comprises an abutment for limiting the pivot angle during pivoting of the container.

It is especially preferred that the sorting device further comprises a partition connected between the container and the sorter, wherein the pivot axle is connected to the partition.

Preferably, the container is made of a transparent material.

The invention further relates to a ramming device for mounting a small part onto a support which ramming device according to the present invention is primarily characterized by:

A ramming tool for mounting the small part onto a support;

A sorting device connected to the ramming tool for supplying a small part to the ramming tool;

The sorting device comprises:

a) a container with a fill opening for receiving the small parts;

b) a drum-shaped rotating sorter for sorting the small parts, the sorter laterally connected to the container;

c) a container having a lateral passage opening into the sorter for transferring the small parts from the container to the sorter; and d) the container comprising a pivot axle for pivoting the container relative to the sorter.

Advantageously, the sorting device further comprises a lid for closing the container.

Preferably, the lid is pivotably connected to the container.

Advantageously, the lid has a substantially U-shaped cross-section.

In a preferred embodiment of the present invention, the container is secured in its filling and operating position.

Expediently, the sorting device further comprises an abutment for limiting a pivot angle during pivoting of the container.

Advantageously, the sorting device further comprises a partition connected between the container and the sorter, wherein the pivot axle is connected to the partition.

Expediently, the container is made of a transparent material.

The gist of the present invention is that the container is supported such that it is pivotable about an axle relative to the rotating sorter.

Due to this inventive embodiment of the sorting device a simple pivoting of the container results in a complete emptying of the container. On the other hand, the operational position of the container can be easily achieved by pivoting the container in the opposite direction and a misalignment is easily detectable. Due to the simple pivotability, securing fasteners or additional fasteners are obsolete so that no operational problems can result from the use of the inventive container which can be easily emptied.

It is furthermore advantageous that in the area of the fill opening of the container a lid is provided. On the one hand, this ensures the operational safety of the device because no foreign objects can enter the container in any undesirable manner. On the other hand, the container is thus secured against accidental emptying. In an advantageous manner the lid is pivotably connected to the container such that in the open position it projects from the container as a continuation of one of the container sidewalls. In an advantageous manner the lid has a substantially U-shaped cross-section. Thus, the container in the pivoted position provides a chute for the small parts during the emptying step. This ensures a controlled emptying of the sorting device.

According to another suggestion of the present invention the container is secured in the fill, respectively, operating position with known securing means. Such securing means, however, are not required for the reliable function of the container but simply represent additional positioning aids for attaining the correct position. For example, they can be in the form of simple snap or catch devices. Of course, it is also possible to use screw means, clamping means etc.

According to another suggestion of the invention, the sorting device is provided with an abutment for limiting the pivoting angle of the container. This ensures that the container can be pivoted only into a defined emptying position. The pivoting axle is advantageously mounted to the partition between the container and the sorter. This arrangement also simultaneously provides a fastening means for the container.

According to another suggestion of the present invention, the container is preferably made of a transparent material which allows for an optimal viewing of the contents of the sorting device.

The present invention further relates to a ramming device for connecting (ramming) small parts such as rivets, eyes, snap fasteners, hooks, buttons, etc. onto a support material which ramming device comprises a sorting device, a ramming tool, and a guide rail positioned between the sorting device and the ramming tool. Such ramming devices are known in general. According to the present invention such a known ramming device is provided with the afore-described inventive sorting device. By doing so, the ramming device is improved with respect to its operational safety and reliability and also with respect to a reliable supply of the small parts to be fastened.

BRIEF DESCRIPTION OF THE DRAWINGS

The object and advantages of the present invention will appear more clearly from the following specification in conjunction with the accompanying drawings, in which:

FIG. 3 shows a schematic frontal view of the sorting device of FIG. 2.

DESCRIPTION OF THE PREFERRED EMBODIMENTS

The present invention will now be described in detail with the aid of several specific embodiments utilizing FIGS. 1 through 3.

Figure 1:
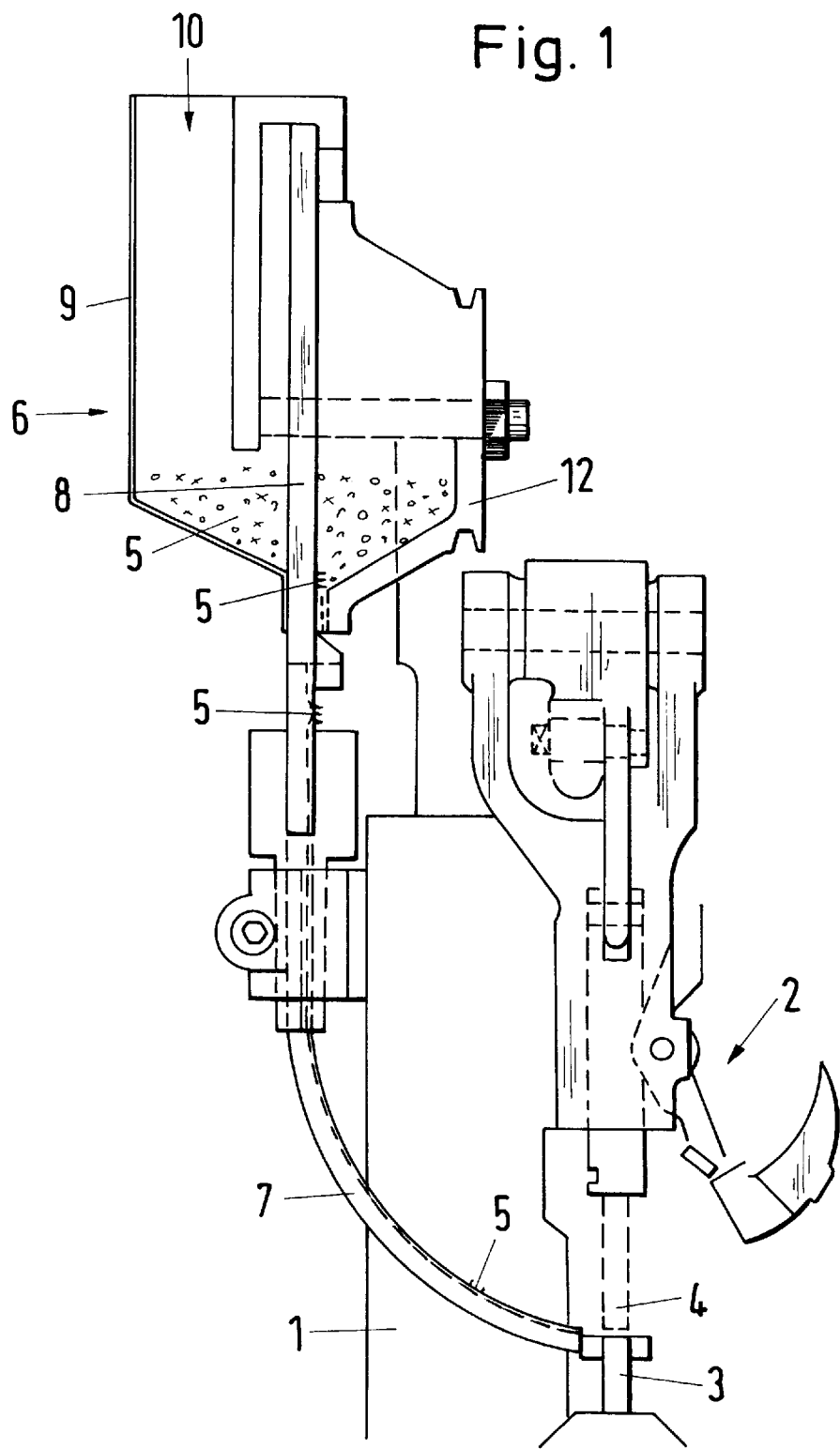
FIG. 1 shows a schematic view of the inventive ramming device.

In order to facilitate understanding of the cooperation of the inventive sorting device with a further processing machine such as a ramming device, FIG. 1 schematically shows such a ramming machine together with the correctly positioned sorting device. The ramming device is comprised of a frame 1 to which is connected a ramming tool 2. The ramming tool 2 is of a conventional design and in the shown embodiment is comprised of an anvil 3 as well as a vertically reciprocating stamp or ram 4. The small parts 5, for example, rivets, eyes, snap fasteners, hooks, and buttons, are guided to the ramming tool 2. These small parts 5 are stored in the sorting device 6. At the lower end of the sorting device a guide rail 7 is provided via which the small parts 5 exiting from the sorting device 6 are guided to the ramming tool 2. The guide rail 7 is curved at its lower end.

Figure 2:
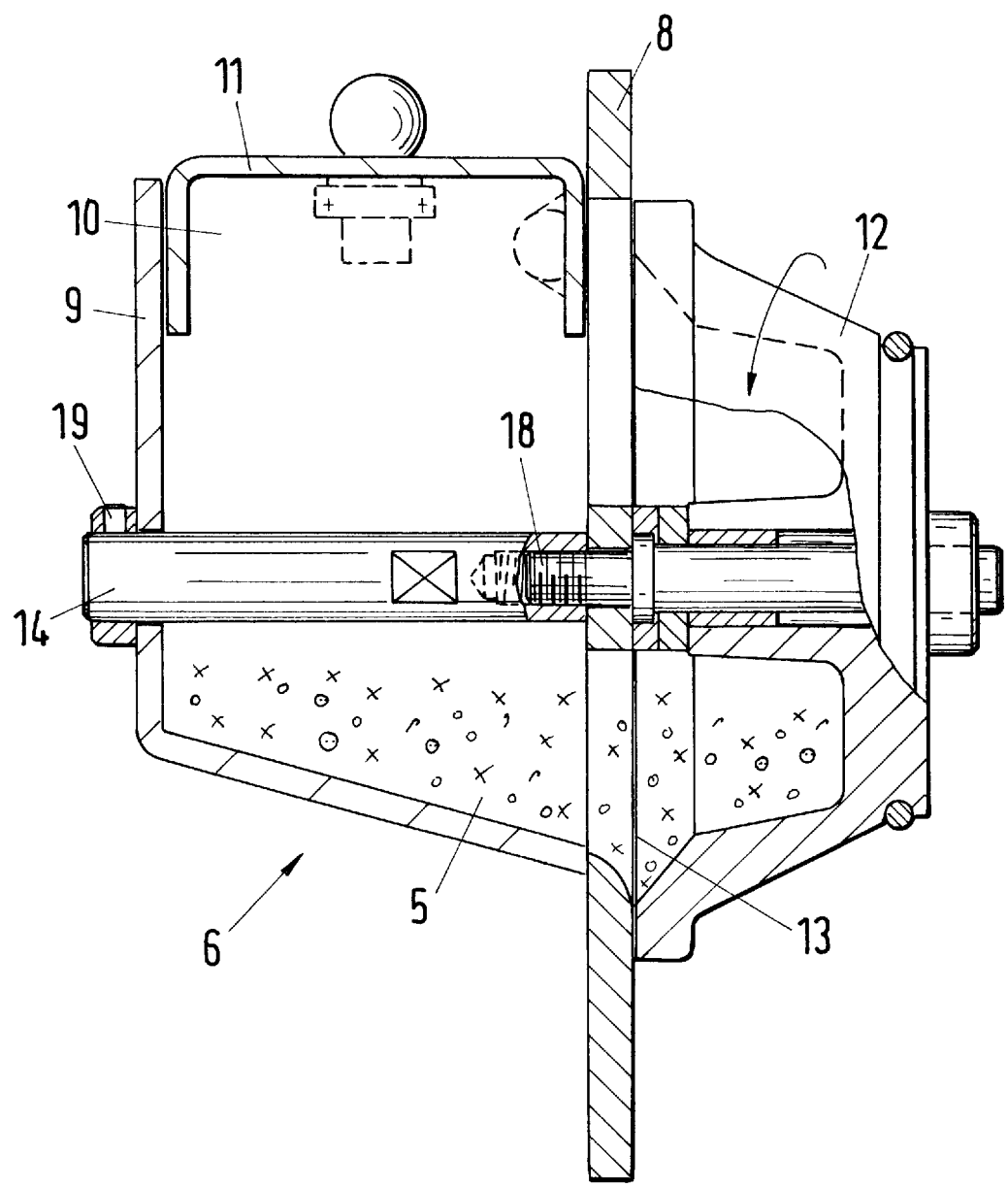
FIG. 2 shows a schematic, part-sectional side view of the inventive sorting device.

One embodiment of the inventive sorting device is represented in FIGS. 2 and 3 in detail. The sorting device 6 is comprised of a container 9 with a fill opening 10 at which a lid 11 is arranged. The container 9 is connected to a partition 8 at the other side of which a rotating sorter 12 is arranged. The container 9 and the sorter 12 communicate in the area of the passage 13. Small parts 5 filled into the container 9 thus can enter the sorter 12. The sorter 12 is driven by a non-represented motor and serves for individualizing and sorting the small parts 5 contained within the sorting device 6. The function of such a sorter 12 is known per se. It comprises a circulating conveyor that transports the individual small parts to the guide rails 7.

In the shown embodiment the container 9 is connected with an axle 14 to the partition 8. This ensures the pivotable support of the container 9 within the sorting device 6. As shown especially in FIG. 3, the container 9 is essentially tub-shaped so that the passage 13 is fully covered even when the container 9 is in its pivoted position.

The container 9, as especially shown in FIG. 3, can be pivoted about the axle 14 from a filling and operating position (solid lines) into a pivoted emptying position (dashed lines) relative to the sorter 12.

The lid 11 is provided with a grip 15 so that the lid 11 can be opened or closed. When the container 9 is pivoted, the lid 11 is initially closed. Due to its substantially U-shaped cross-section, the lid 11, which can be pivoted about the pivot axis 16, serves during emptying as a chute for the small parts 5 contained within the container 9. This ensures a controlled emptying of the container.

An abutment 17 is arranged at the partition 8 which abutment 17 limits the pivot angle of the container 9. The axle 14 in the shown embodiment is connected with a threaded bolt 18 to the partition 8 and at is forward end is provided with a securing means 19. Due to this simple construction a simple exchangeability of the container is ensured. The container is preferably transparent so that the operator can view the contents of the sorting device 6.

The present invention is, of course, in no way restricted to the specific disclosure of the specification and drawings, but also encompasses any modifications within the scope of the appended claims.

What we claim is:

1. The sorting device for supplying small parts to a processing machine, said sorting device comprising:

a container having a top side with a fill opening for receiving small parts;

a drum-shaped rotating sorter for sorting the small parts;

a partition separating said container from said sorter, said partition having a first and a second opposite planar side, wherein said container is connected to said first planar side and said sorter is connected to said second planar side;

said partition having a passage for transferring the small parts from said container to said sorter, said passage interconnecting an interior of said container with an interior of said sorter; a pivot axle extending perpendicular to said partition and supporting said container, such that said container pivots about said pivot axle in a plane parallel to said planar sides, relative to said sorter between an upright position and an emptying position; and a lid pivotally connected to said container along a pivot axis that extends parallel to said pivot axle and is located at a leading end of said fill opening when said container pivots from said upright position to said emptying position, such that said lid closes said fill opening in said upright position and pivots about said pivot axis away from said fill opening into an open position when said container pivots about said pivot axle to said emptying position, wherein in said open position said lid is a chute that guides the small parts from said container.

2. The sorting device according to claim 1, wherein said lid has a substantially U-shaped cross-section.

3. The sorting device according to claim 1, and further comprising means for securing said container in said upright position.

4. The sorting device according to claim 1, and further comprising means for stopping and supporting said container in said emptying position.

5. The sorting device according to claim 1, wherein said pivot axle is connected to said partition.

6. The sorting device according to claim 1, wherein said container is made of a transparent material.

7. The ramming device for mounting a small part onto a support, said ramming device comprising:

a ramming tool for mounting a small part onto a support;

a sorting device connected to said ramming tool for supplying a small part to said ramming tool;

said sorting device comprising:

a) a container having a top side with a fill opening for receiving small parts;

b) a drum-shaped rotating sorter for sorting the small parts;

c) a partition separating said container from said sorter, said partition having a first and a second opposite planar side, wherein said container is connected to said first planar side and said sorter is connected to said second planar side;

d) said partition having a passage for transferring the small parts from said container to said sorter, said passage interconnecting an interior of said container with an interior of said sorter;

e) a pivot axle extending perpendicular to said partition and supporting said container, such that said container pivots about said pivot axle in a plane parallel to said planar sides relative to said sorter between an upright position and an emptying position; and a lid pivotally connected to said container along a pivot axis that extends parallel to said pivot axle and is located at a leading end of said fill opening when said container pivots from said upright position to said emptying position, such that said lid closes said fill opening in said upright position and pivots about said pivot axis away form said fill opening into an open position when said container pivots about said pivot axle to said emptying position, wherein in said open position said lid is a chute that guides the small parts from said container.

8. The ramming device according to claim 7, wherein said lid has a substantially U-shaped cross-section.

9. The ramming device according to claim 7, and further comprising means for securing said container in said upright position.

10. The ramming device according to claim 7, and further comprising means for stopping and supporting said container in said emptying position.

11. The ramming device according to claim 7, wherein said pivot axle is connected to said partition.

12. The ramming device according to claim 7, wherein said container is made of a transparent material.

* * * * *